June 23, 1936. E. R. HOPKINS Re. 20,016

REFRIGERATING COIL

Original Filed June 13, 1932

INVENTOR,
Ernest R. Hopkins.
BY
Hovey & Hamilton.
ATTORNEYS.

Reissued June 23, 1936

Re. 20,016

UNITED STATES PATENT OFFICE 20,016

REFRIGERATING COIL

Ernest R. Hopkins, Kansas City, Mo., assignor of one-half to James P. Curry, Kansas City, Mo.

Original No. 1,966,096, dated July 10, 1934, Serial No. 616,833, June 13, 1932. Application for reissue August 16, 1935, Serial No. 36,557

21 Claims. (Cl. 257—255)

This invention relates to refrigeration, and particularly cooling apparatus in the form of a refrigerating coil which may be used wherever it is desired, and altered with respect to its capacity as the conditions require, and one of the important and primary objects of the invention is to provide a refrigerating coil constructed in a manner which will permit of quickly adding a cooling unit for the purpose mentioned, as well as to facilitate and expedite installation and to more positively control the temperatures within a refrigerating compartment.

A still further and important aim of the instant invention is the contemplation of a new and novel refrigerating coil that is made up of a plurality of juxtaposed units, wherein is incorporated a length of conduit of flattened, tubular, cross-section; a perforated baffle member within said conduit in contact with the inside thereof at spaced apart staggered points; and a plurality of spaced, corrugated fins in heat exchanging contact with said conduit at points substantially opposite the points of contact of said baffle member, all for the purpose of conducting a refrigerant and producing a heat exchanger that is exceptionally efficient for the amount of refrigerant used and is highly effective in maintaining a predetermined cooling temperature.

A yet further object of the invention is to provide a refrigerating coil having a number of inter-related units, said units being adjustably maintained in assembled relation, whereby they may be moved to and from each other to suit conditions, said adjustment being arranged to permit interconnecting conduits of the refrigerant conduits of the units to permit the passage of a refrigerant through all units from a single source of supply.

The many minor objects of this invention are extremely important, the relation of parts, their form and association, all being exceptionally novel to the extent that their combination creates a refrigerating coil found to be relatively cheap to manufacture, low in maintenance cost, and desirable from the standpoint of results obtained and cost of operation.

With the above broad concepts of the invention in mind, the invention will now be described by reference to the accompanying drawing, wherein.

Figure 1:
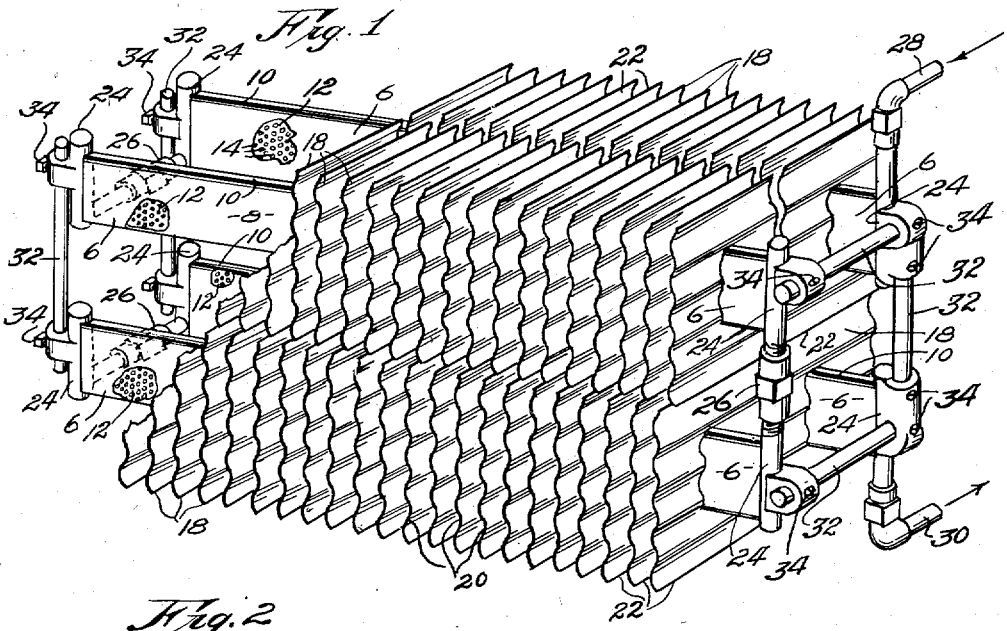
Figure 1 is a broken perspective view of a refrigerating coil built to incorporate the present invention.
Figure 2:
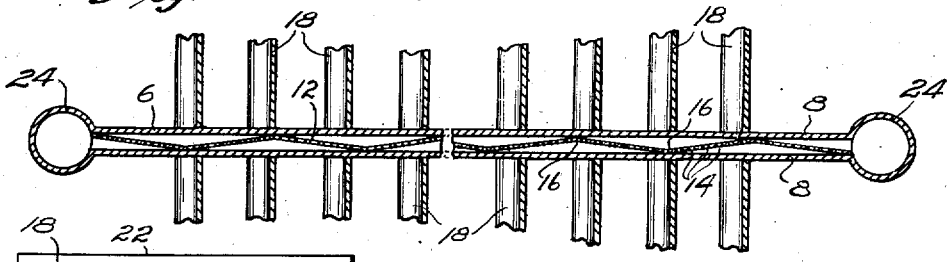
Fig. 2 is a fragmentary, longitudinal, central section through a portion of one unit of the coil shown in Fig. 1.

As indicated in Fig. 1, a refrigerating coil embodying this invention may include any number of units placed in parallel relation, one above the other, or side by side. These units are adjustably interconnected as hereinafter set down, and since each unit is substantially identical, the following description of one of the same will render clear the exact structural features thereof.

Figure 3:
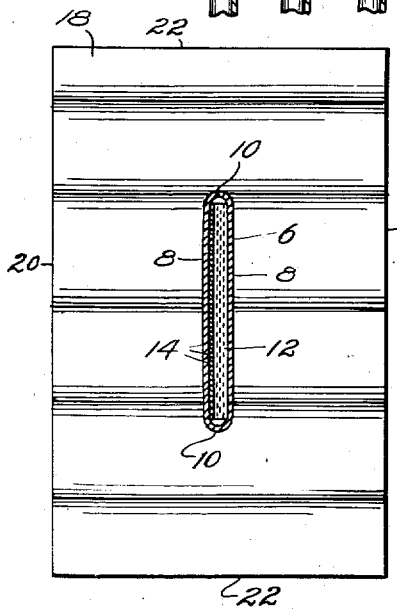
Fig. 3 is a vertical, cross-section through one unit taken between two of the spaced apart fins, and, Fig. 4 is an enlarged, fragmentary, detailed, sectional view through a portion of the refrigerant conduit forming one of the units.
Figure 4:
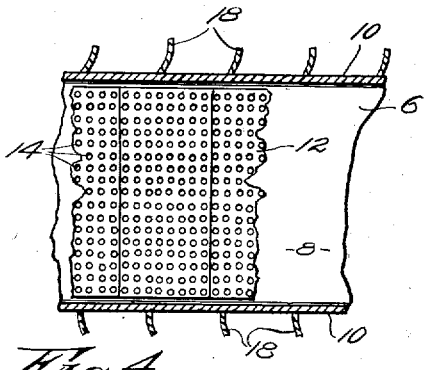

Each unit comprises a conduit 6 of any predetermined length, which is made of heat conducting metal and formed to present a flattened, tubular, cross-section having parallel sides 8 and arcuate edges 10, as illustrated in Fig. 3. In forming the conduit in this fashion, the same is caused to present an attenuated passage for the refrigerant which presents a relatively large area of contacting surface to the volume of refrigerant passing therethrough.

The use of a conduit of this form has been found to be highly efficient and to further amplify its efficiency, there has been associated therewith a baffle member 12, having perforations 14 formed therethrough and created of heat conducting metal for the same reasons as those set down for conduit 6. This baffle member is preferably formed of resilient metal and extends longitudinally through conduit 6 in a zig-zag path whereby it contacts the opposite sides of conduit 6 in staggered points 16 therealong.

In forming baffle member 12, the zig-zag path of the same should be somewhat wider than it is when member 12 is in place. Thus, when positioning member 12, the contact set up at points 16 is a frictional one and of sufficient intensity to positively assure conductivity of heat from member 12 to sides 8 of conduit 6.

Points 16 present rectilinear surfaces against the inner face of refrigerant conduit 6 that are quite extended in area. This area is greater than the cross sectional area of baffle member 12 and, consequently heat absorbed by the surfaces 16 from the wall of conduit 6 flows quickly to the stretches of baffle member 12 between surfaces 16. During normal operation of the coil, there is a differential in temperature between the surfaces 16 and the stretches of baffle member 12 which maintains a tendency for heat to flow into the refrigerant through the sides of conduit 6 by way of surfaces 16 of member 12 and the stretches thereof between such surfaces that are constantly bathed in the refrigerant.

Rectilinear surfaces at points 16 are parallel to each other and preferably equidistant apart to insure even, constant passage of heat into the stream of refrigerant. It has been found advisable to make member 12 of metal having high heat conductivity such as aluminum, copper or brass.

The nature of member 12, after being bent to form a laterally compressible unit is such as will present alternately opposite sides of the strip to the inner surface of said coil to the end that heat exchange is further facilitated.

By such construction it is possible to raise the temperature of the refrigerant to an exceptionally high degree after a single passage through the coil. Pressure and speed of the refrigerant is likewise efficiently altered and the heat absorbing power throughout the entire length of travel of the refrigerant is amplified by baffling the flowing stream thereof and associating therewith the parts here set forth.

The circulating air within the refrigerator or other compartment is brought into contact with a series of spaced apart fins 18, each of which is corrugated transversely of the normal flow of air within the refrigerator to create a serpentine path therebetween which precludes establishing an air column, and which contacts the moving air to a greater extent than is the case with the ordinary planar fins. Fins 18 are in heat conducting and exchanging relation with the length of conduit 6, and while soldering the same has been found to be most advantageous, the association might be set up through any of the well known mechanical means which permits proper heat exchange.

As illustrated in Fig. 3, each fin 18 is a separate element a the distance between opposite, vertical edges 20 and the adjoining sides 8 of conduit 6 is substantially the same as the distance between either upper or lower edge 22 of fin 18 and edge 10 of conduit 6. The size of fin 18 is determined by the size of conduit 6, and the action of the particular refrigerant used. The reason for establishing a relation between fin and conduit 18 and 6 respectively as just mentioned is to utilize every square inch of fin surface. The parts shown in Fig. 3 are full sized and when such are used, there is never a part of fin 18 from which the refrigerant is not actually drawing, by conduction, the heat absorbed by the fin.

Manifestly, this type of construction overcomes the objection of bringing into a refrigerating coil a certain amount of air contacting surface which is not under the control of the refrigerant.

The foregoing makes clear the manner of creating the individual unit making up a refrigerating coil constructed in accordance with this invention, and reference to Fig. 1 and the following will fully disclose the manner of associating a number of these units. A hollow terminal member 24 is in communication with each conduit 6 at each end respectively thereof, and appropriate fittings 26 adjustably interconnect these members 24 so that a continuous flow of refrigerant from intake pipe 28 to exit pipe 30 may be established. These fittings 26 include ordinary couplings which co-operate with tie rods 32 in permitting adjustment on the part of the units toward and from each other. Appropriate set screws 34 complete the adjusting apparatus, and since such adjustment is usually slight, the parts as mentioned are capable of permitting the movement desired.

The travel of air in the compartment is in a vertical path. Since it is desired to break up the current of air as far as possible, it is important that the vertically aligned units have the fins offset in staggered relation as shown. That is to say, the fins of the lowermost unit lie in planes between the fins of the upper unit. The units positioned side by side have the fins thereof disposed in the same vertical plane, but free circulation of air is permitted between the units arranged side by side by spacing apart the fins thereof. This space may be altered in conformity with the volume of air passing between the refrigerating coil fins and practically any condition of refrigeration might be met by adjusting the units, adding units of various lengths, or increasing or decreasing the sizes of the units used.

Having thus described the invention, what is claimed as new and desired to be secured by Letters Patent is:

1. A refrigerating coil comprising a plurality of juxtaposed units each having a refrigerant conduit and a plurality of fins in heat exchanging relation with a predetermined length of said conduit, said predetermined length of conduit being flattened-tubular in cross-section to form an attenuated refrigerant passage; and a perforated heat-conducting baffle member within said length of conduit in contact with the inner face of said conduit, said baffle member being of the same general flattened cross section as the said flattened conduit and formed of a single piece of sheet metal provided with perforations therethrough whereby to present smooth surfaces to the refrigerant passing through the conduit.

2. In a refrigerating coil, a refrigerant conduit; a plurality of fins in heat exchanging contact with the outside of said conduit; and a baffle member of heat conducting material within said conduit in heat exchanging contact with the inside of said conduit, said baffle member comprising a single perforated strip of resilient sheet metal extending longitudinally along said conduit in a zig-zag path to contact opposite sides of said conduit at staggered points therealong.

3. In a refrigerating coil, a refrigerant conduit; a plurality of fins in heat exchanging contact with the outside of said conduit; and a baffle member of heat conducting material within said conduit in heat exchanging contact with the inside of said conduit, said baffle member comprising a perforated, zig-zag, resilient single strip of sheet metal extending longitudinally along said conduit in contact with the opposite sides of said conduit at staggered points therealong, said strip being maintained in position by frictional engagement with the inner face of said conduit.

4. A refrigerating coil comprising a plurality of juxtaposed units each having a refrigerant conduit and a plurality of fins in heat exchanging relation with a predetermined length of said conduit, said predetermined length of conduit being flattened-tubular in cross-section to form an attenuated refrigerant passage; and a heat conducting baffle member within said length of conduit, said baffle member being slidable to and from assembled relation within the conduit and frictionally engaging the inner face of the conduit when positioned in such relation at spaced points throughout its length, an engaging point being adjacent each point of connection between said fins and conduit, said baffle member being of the same general flattened cross section as the said flattened conduit.

5. In a refrigerating coil, a refrigerant conduit; a plurality of fins in heat exchanging contact with the outside of said conduit and in spaced-apart relation therealong; and a baffle member of heat conducting material within said conduit, extending longitudinally along said conduit in a zig-zag path to contact opposite sides of said conduit at staggered points therealong, said points of contact within the conduit being substantially the same distance apart and in the same transverse planes as the contact points of the said spaced-apart fins.

6. A refrigerating coil comprising a plurality of juxtaposed units each having a refrigerant conduit and a plurality of fins in heat exchanging relation with predetermined lengths of said conduit, said lengths being parallel to each other and the fins thereon extending therefrom in planes perpendicular to the conduit lengths; and adjustable means to move said predetermined lengths of the conduit toward and from each other as such adjustment is made certain of said adjustable means being hollow to serve as conductors of refrigerant from one unit to another and others being solid tie rods to maintain the units in adjusted position.

7. A refrigerating coil comprising a plurality of juxtaposed units each having a refrigerant conduit and a plurality of fins in heat exchanging relation with predetermined lengths of said conduit, said lengths being parallel to each other and the fins thereon extending therefrom in a plane perpendicular to the conduit lengths; and means to adjust said predetermined lengths of the conduit toward and from each other, the fins of said units above and below each other being in staggered offset relation, said adjusting means comprising hollow terminal members each having adjustable fittings interposed therein to lengthen and shorten the distance between said terminal members and tie rods slidably joining said units in cooperative relation with said terminal members.

8. A refrigerating coil comprising, in combination, a plurality of juxtaposed units each having a length of refrigerant conduit of flattened-tubular cross-section, a plurality of spaced apart, corrugated fins carried by said length of refrigerant conduit in heat exchanging contact therewith, the distance from the edges of said fins to the conduit being substantially the same, a perforated baffle strip of heat conducting material extending in a zig-zag path longitudinally through said flattened-tubular length of conduit, said baffle member contacting the inside of said conduit at staggered points in the same plane as the adjacent fins; means adjustably maintaining said units in predetermined spaced relation with the fins of the horizontally aligned units in the same plane and the fins of the vertically aligned units in staggered offset relation; and means to supply refrigerant to said conduits.

9. In a refrigerating coil, a refrigerant conduit having a plurality of fins in heat exchanging contact with the outside of said conduit; a member of heat conducting material within said conduit comprising a smooth sided, single resilient strip of sheet metal extending longitudinally along said refrigerating conduit in frictional engagement with the inner face thereof and exerting lateral pressure thereagainst.

10. In a refrigerating coil, a refrigerant conduit having a plurality of fins in heat exchanging contact with the outside of said conduit; a member of heat conducting material within said conduit comprising a deformed strip of resilient material extending longitudinally along said refrigerating conduit in frictional engagement with the inner face thereof and exerting an appreciable amount of lateral pressure thereagainst at spaced apart rectilinear surfaces, said member being formed of a single strip of sheet metal.

11. In a refrigerating coil, a refrigerant conduit having a plurality of fins in heat exchanging contact with the outside of said conduit; a member of heat conducting material within said conduit comprising a deformed strip of resilient material extending longitudinally along said refrigerating conduit in frictional engagement with the inner face thereof and exerting an appreciable amount of lateral pressure thereagainst at spaced apart rectilinear surfaces, said surfaces being parallel to each other for the purpose specified, said member being formed of a single strip of sheet metal.

12. In a refrigerating coil, a refrigerant conduit having a plurality of fins in heat exchanging contact with the outside of said conduit; a single piece, sheet metal member of heat conducting material within said conduit comprising a deformed strip of resilient material extending longitudinally along said refrigerating conduit in frictional engagement with the inner face thereof at spaced apart rectilinear surfaces, said surfaces being formed by bending the said strip to present portions of the surfaces of the strip against the inner face of the said conduit, said member having a greater transverse cross sectional dimension when out of operative position than when in operative position within the conduit.

13. In a refrigerating coil, a refrigerant conduit having a plurality of fins in heat exchanging contact with the outside of said conduit; a member of heat conducting material within said conduit comprising a deformed strip of resilient material extending longitudinally along said refrigerating conduit in frictional engagement with the inner face thereof at spaced apart rectilinear surfaces, said surfaces being formed by bending the said strip to present portions of the surfaces of the strip against the inner face of the said conduit, said surfaces each being greater in area than the cross-sectional area of said strip, said member being formed of a single piece of sheet metal.

14. In a refrigerating coil, a refrigerant conduit; a plurality of fins in heat exchanging contact with the outside of said conduit; and a member of heat conducting material within said conduit comprising an initially planar strip of sheet metal extending longitudinally along said refrigerating conduit in frictional engagement with the inner face thereof at spaced apart rectilinear surfaces, said surfaces being formed by bending the said strip to present portions of the surfaces of the strip against the inner face of the said conduit, the stretches of said strip between the spaced apart rectilinear surfaces being substantially equal in area and disposed within the stream of refrigerant passing through the coil.

15. In a refrigerating coil, a refrigerant conduit; a plurality of fins in heat exchanging contact with the outside of said conduit; and a member of heat conducting material within said conduit comprising an initially planar strip of sheet metal extending longitudinally along said refrigerating conduit in frictional engagement with the inner face thereof at spaced apart rectilinear surfaces, said surfaces being formed by bending the said strip to present portions of the surfaces of the strip against the inner face of the said conduit, the stretches of said strip between the spaced apart rectilinear surfaces having perforations therein and being substantially equal in area for the purpose specified.

16. In a refrigerating coil, a refrigerant conduit; a plurality of fins in heat exchanging contact with the outside of said conduit; and a member of heat conducting material within said conduit comprising a laterally compressible, initially planar strip of sheet metal extending longitudinally along said refrigerating conduit having bent portions in frictional engagement with the inner surface of said conduit.

17. In a refrigerating coil, a refrigerant conduit; a plurality of fins in heat exchanging contact with the outside of said conduit; and a member of heat conducting material within said conduit comprising a laterally compressible strip of sheet metal extending longitudinally along said refrigerating conduit having parallel, spaced apart bent portions in frictional engagement with the inner surface of said conduit.

18. In a refrigerating coil, a refrigerant conduit; a plurality of fins in heat exchanging contact with the outside of said conduit; and a member of heat conducting material within said conduit comprising a laterally compressible, initially planar strip of sheet metal extending longitudinally along said refrigerating conduit having parallel, spaced apart bent portions in frictional engagement with the inner surface of said conduit; said strip exerting an appreciable amount of lateral pressure against the coil along said bent portions thereof.

19. In a refrigerating coil, a refrigerant conduit; a plurality of fins in heat exchanging contact with the outside of said conduit; and a member of heat conducting material within said conduit comprising a laterally compressible, initially planar strip of sheet metal extending longitudinally along said refrigerating conduit having bent portions along the body thereof held in frictional engagement with the inner surface of said conduit when the strip is in place.

20. In a refrigerating coil, a refrigerant conduit; a plurality of fins in heat exchanging contact with the outside of said conduit; and a member of heat conducting material within said conduit comprising a laterally compressible, initially planar strip of sheet metal extending longitudinally along said refrigerating conduit having bent portions along the body thereof held in frictional engagement with the inner surface of said conduit when the strip is in place; said bent portions being parallel to each other and spaced equal distances apart whereby to present stretches of the strip of equal areas to the refrigerant and to present alternately opposite sides of the strip to the said inner surface of said conduit.

21. In a heat exchanger assembly having a conduit for the primary substance and fins on the conduit for contacting the secondary or substance being acted upon, the combination of a solid strip of resilient sheet metal extending longitudinally along within said conduit and serving to conduct heat units inwardly from the walls of the conduit to the central zone of the primary substance, said strip being bent to set off segments within the conduit and provided with perforations forming means of communication between the segments, the sides of said strip of sheet metal being smooth and in frictional engagement with the inner face of said conduit at the lines of bend whereby a substantially tight joint is formed at the zones of engagement between said strip and conduit, and the suction pressure from one segment to the next adjoining is increased.

ERNEST R. HOPKINS.